US011945951B2

(12) United States Patent
Schulz et al.

(10) Patent No.: US 11,945,951 B2
(45) Date of Patent: Apr. 2, 2024

(54) FORMULATION AND ITS USE AS DEFOAMER

(71) Applicant: Evonik Operations GmbH, Essen (DE)

(72) Inventors: Alexander Schulz, Essen (DE); Philippe Favresse, Ratingen (DE); Sascha Herrwerth, Freigericht (DE); Frank Schubert, Neukirchen-Vluyn (DE); Matthias Lobert, Essen (DE); Johannes Troendlin, Essen (DE); Thomas Thomalla, Essen (DE); Thorsten Schierle, Essen (DE); Michael Gippert, Essen (DE); Jonas Urbath, Wuppertal (DE)

(73) Assignee: Evonik Operations GmbH, Essen (DE)

( * ) Notice: Subject to any disclaimer, the term of this patent is extended or adjusted under 35 U.S.C. 154(b) by 234 days.

(21) Appl. No.: 17/126,172

(22) Filed: Dec. 18, 2020

(65) Prior Publication Data

US 2021/0206972 A1 Jul. 8, 2021

(30) Foreign Application Priority Data

Jan. 8, 2020 (EP) .................................... 20150732

(51) Int. Cl.
| C08L 83/06 | (2006.01) |
| C08G 77/46 | (2006.01) |
| C08K 3/36 | (2006.01) |
| C09D 7/61 | (2018.01) |
| C09D 7/65 | (2018.01) |
| C09D 183/12 | (2006.01) |

(52) U.S. Cl.
CPC .............. *C08L 83/06* (2013.01); *C08G 77/46* (2013.01); *C08K 3/36* (2013.01); *C09D 7/61* (2018.01); *C09D 7/65* (2018.01); *C09D 183/12* (2013.01)

(58) Field of Classification Search
CPC ........... C08G 77/46; C08K 3/36; C08L 83/06; C09D 7/61; C09D 71/65; C09D 183/12
See application file for complete search history.

(56) References Cited

U.S. PATENT DOCUMENTS

| 3,865,544 A | 2/1975 | Keil |
| 4,024,090 A | 5/1977 | Von Bonin et al. |
| 4,690,713 A | 9/1987 | Terae et al. |
| 5,846,454 A | 12/1998 | Koczo et al. |
| 5,914,362 A | 6/1999 | Brecht et al. |
| 6,406,686 B1 * | 6/2002 | Chun ...................... A61Q 5/12 424/70.21 |
| 6,605,813 B1 | 8/2003 | Rautschek et al. |
| 7,442,724 B2 | 10/2008 | Esselborn et al. |
| 7,759,402 B2 | 7/2010 | Venzmer et al. |
| 7,838,603 B2 | 11/2010 | Schwab et al. |
| 8,685,376 B2 | 4/2014 | Czech et al. |
| 8,772,423 B2 | 7/2014 | De Gans et al. |
| 8,779,079 B2 | 7/2014 | Henning et al. |
| 8,802,744 B2 | 8/2014 | Knott et al. |
| 8,993,792 B2 | 3/2015 | Hartung et al. |
| 9,051,424 B2 | 6/2015 | Lobert et al. |
| 9,738,797 B2 | 8/2017 | Nilewski et al. |
| 10,010,838 B2 | 7/2018 | Favresse et al. |
| 10,370,493 B2 | 8/2019 | Brandt et al. |
| 10,399,051 B2 | 9/2019 | Favresse et al. |
| 10,577,512 B2 | 3/2020 | Aitha et al. |
| 10,752,801 B2 | 8/2020 | Favresse et al. |
| 2004/0198842 A1 | 10/2004 | Bocker et al. |
| 2009/0007483 A1 | 1/2009 | Hansel et al. |
| 2009/0227481 A1 | 9/2009 | Wang et al. |
| 2011/0144269 A1 | 6/2011 | Kuppert et al. |
| 2012/0037036 A1 | 2/2012 | Veit et al. |
| 2014/0256844 A1 | 9/2014 | Henning et al. |
| 2019/0040205 A1 * | 2/2019 | Knott ...................... C08G 77/16 |
| 2020/0377663 A1 | 12/2020 | Favresse et al. |
| 2021/0238361 A1 | 8/2021 | Lobert et al. |

FOREIGN PATENT DOCUMENTS

| CA | 2006400 A | * 7/1990 | ......... B01D 19/0404 |
| CA | 2142537 C | * 11/2000 | ............. A61K 8/894 |
| JP | 2005013894 A | * 1/2005 | |
| KR | 101236494 B1 | * 2/2013 | ............... C08K 5/05 |

OTHER PUBLICATIONS

English-language machine translation of JP 2005013894A (Year: 2005).*
EP Search Report dated May 14, 2020 in EP 20150732.4 (7 pages).

* cited by examiner

*Primary Examiner* — James C Goloboy
(74) *Attorney, Agent, or Firm* — Grüneberg and Myers PLLC

(57) ABSTRACT

The present invention relates to a formulation comprising a polyether siloxane, which is characterized in that a polyether that is terminated with an ester group and that is different from the polyether siloxane is present in the formulation in an amount of from 0.5 to 10% by weight based on the complete formulation, to a process for the production of a defoamed composition, wherein the inventive formulation is added to the composition to be defoamed, and to a composition comprising a formulation according to the invention, wherein the composition is a coating agent, a paint or a varnish.

17 Claims, No Drawings

FORMULATION AND ITS USE AS DEFOAMER

CROSS REFERENCE TO RELATED APPLICATIONS

This application is a 35 U.S.C. § 119 patent application which claims the benefit of European Application No. 20150732.5 filed Jan. 8, 2020, which is incorporated herein by reference in its entirety.

FIELD

The present invention relates to a formulation comprising a polyether siloxane, which is characterized in that a polyether that is terminated with an ester group and that is different from the polyether siloxane is present in the formulation in an amount of from 0.5 to 10% by weight based on the complete formulation, to a process for the production of a defoamed composition, wherein the inventive formulation is added to the composition to be defoamed, and to a composition comprising a formulation according to the invention, wherein the composition is a coating agent, a paint or a varnish.

BACKGROUND

Defoamers bring about the accelerated coalescence of gas bubbles in fluid material systems. As a result of this, the formation of foam is avoided or considerably reduced. If foam fractions are already present prior to adding the defoamers, said fractions are destabilized. The product class of defoamers has already been used for several decades in many product areas. Examples of these product areas are foods, pharmaceuticals, cosmetics, paper, paints and coatings.

Many known defoamers are described in U.S. Pat. Nos. 6,605,183, 5,914,362, 5,846,454 and 4,690,713. Generally, they are based on silicone oil (polyether modified siloxanes) and/or silica particles. Those defoamers are for example available under the trade names TEGO® Antifoam, TEGO® Foamex, and TEGO® Airex from Evonik Resource Efficiency GmbH.

It was often observed, that some of these defoamers show very good defoaming performance but were not compatible with some coating compositions, resulting in final coatings showing defects, e.g. sinkholes.

It was therefore an object of the present invention to enhance the compatibility of the known defoamers based on polyether siloxanes without decreasing the defoaming abilities.

SUMMARY

Surprisingly the inventors found, that this problem could be solved by using a formulation according to the invention as claimed in claim 1 comprising a polyether siloxane and a polyether that is terminated with an ester group and which is present in the formulation in an amount of from 0.5 to 10% by weight based on the complete formulation.

DETAILED DESCRIPTION

The present invention therefore provides a formulation comprising a polyether siloxane, which is characterized in that a polyether that is terminated with an ester group and that is different from the polyether siloxane is present in the formulation in an amount of from 0.5 to 10% by weight based on the complete formulation.

The present invention also provides a process for producing a defoamed composition, wherein the inventive formulation is added to the composition to be defoamed.

The present invention further provides a composition comprising a formulation according to the invention, wherein the composition is a coating agent, a paint or a varnish.

The formulation according to the invention has the advantage that compared to known defoamer formulations good or even better defoaming abilities are achieved without the formation of defects in the final coating. The use of a formation according to the invention is especially advantageous in the of water based coating compositions.

The formulations, compositions, processes, and uses according to the invention are described by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Percentages specified hereinbelow are by weight unless otherwise stated. Where average values are reported hereinafter, these are the numerical average, unless stated otherwise. Where properties of a material are referred to hereinafter, for example viscosities or the like, these are the properties of the material at 25° C., unless stated otherwise. Where chemical (empirical) formulae are used in the present invention, the specified indices may be not only absolute numbers but also average values.

The present invention is directed to a formulation comprising a polyether siloxane, wherein the formulation is characterized in that a polyether that is terminated with an ester group and that is different from the polyether siloxane is present in the formulation in an amount of from 0.5 to 10% by weight, preferably in an amount of from 0.75 to 7.5% by weight, and more preferably in an amount of from 1 to 5% by weight based on the complete formulation. Preferably the polyether that is terminated with an ester group does not contain any Si atom. Preferably the polyether terminated with an ester group is terminated with an ester group selected from sulfate, phosphorylate, or maleate group. Most preferred the polyether terminated with an ester group is terminated with a sulfate group as ester group.

According to the present invention any polyether terminated with an ester group containing either oxyethylene units based on ethylene oxide or oxypropylene units based on propylene oxide or a mixture of oxyethylene and oxypropylene units can be used. Preferably the polyethers terminated with an ester group have a number average molecular weight between 400 g/mol and 10,000 g/mol. Preferred are polyethers deriving from starters with 1 to 4 hydroxy groups, especially from mono hydroxy functional alcohols like methanol, ethanol, allyl alcohol, 1-propanol, isopropanol, 1-butanol, 2-butanol, isobutanol, 1-hexanol and fatty alcohols with 8 to 20 carbon atoms. The polyether might be terminated on both (all) ends with an ester group. Preferred polyethers are those having only one terminal ester group. The polyether terminated with an ester group is preferably a polypropylene glycol monobutyl ether. More preferably the polyether terminated with an ester group is a polypropylene glycol monobutyl ether terminated with a sulfate group.

It is preferred, that the polyether of the polyether siloxane is not terminated with an ester group.

It might be advantageous if the formulation according to the invention comprises silica, preferably fumed silica. The amount of silica present in the formulation of the invention preferably is from 0.1 to 8% by weight, more preferably 2 to 5% by weight based on the complete formulation.

The formulation of the invention might comprise one or more solvents. It may be advantageous if water is present in the formulation as solvent. Further solvents, e.g. organic solvents may be present in the formulation of the invention. However, preferred formulations according to the invention comprise less than 5% by weight, more preferably less than 1% by weight based on the complete formulation of organic solvents.

If the formulation according to the invention comprises water, the formulation is preferably an emulsion, more preferably an oil in water emulsion (O/W-emulsion). If the formulation according to the invention is an emulsion, the emulsion preferably being a macro emulsion. The emulsion preferably further contains one or more suitable emulsifier, thickener, and/or, preferably and, biocide.

The polyether-radical of the polyether siloxane might be connected to the siloxane backbone via a Si—C-bond or an Si—O—C-bond. Preferably the formulation according to the invention comprises polyether siloxanes, where the polyether-radical is connected to the siloxane backbone via a Si—O—C-bond.

The siloxane backbone of the polyether siloxane, present in the formulation according to the invention, might be of any kind, e.g. linear or branched. If polyether siloxanes having a linear siloxane backbone are used, it is preferred to us polyether siloxanes with terminal polyether groups. The linear or branched polyether siloxanes may be obtained by any known synthetic process, like chlorine, alkoxy and acetoxy process.

The polyether siloxane, present in the formulation according to the invention, is most preferably of the general formula described by formula (I)

More preferably the formulation of the invention comprises a polyether siloxane described by formula (I) where b+b', c+c'>0, preferably 2 and R, $R_1$, and $R_2$ are the radical —Z—$(C_nH_{2n}O—)_mR_3$, where $R_3$ is a hydrogen radical or an alkyl radical having 1 to 8 carbon atoms, Z is a divalent radical of the formula —O—, —$(CH_2)_p$—O— or —$CH_2$—$CH(CH_3)$—$CH_2$—O— with p=2 to 6, with molar weights (Mn)>1000 g/mol, preferably Mn between 1,000 to 6,000 g/mol and Mw from 8.000 to 20.000 g/mol respectively, more preferably Mn from 2,000 to 5,000 g/mol and Mw from 10,000 to 16,000 g/mol respectively. The GPC curve might be monomodal or polymodal, preferably it is polymodal.

The formulation according to the invention is preferably a defoamer formulation.

The process according to the invention for producing a defoamed composition, is characterized in that that a formulation according to the invention is added to a composition to be defoamed. Preferably the formulation is added to the composition in an amount of from 0.05 to 2% by weight, more preferably of from 0.1 to 0.5% by weight based on the composition to be defoamed.

The compositions (to be defoamed) of the invention can be of any kind. Preferably the composition of the invention is selected from printing inks, overprint varnishes and other paints, lacquers, inks, color and pigment preparations and coatings applied via analog or digital coating or printing processes.

The compositions (to be defoamed) of the invention are especially suitable for printing of films, paper, card, cardboard, folding boxes, pouches, bags, wallpaper, sacks, hygiene paper, labels, drinks cartons, boards, wood surfaces, metal surfaces, plastic surfaces, glass and/or ceramic.

Especially good results can be obtained when the compositions of the invention are used on products in packaging and coatings industry like, for example packaging and consumer articles made of paper and cardboard packaging.

These especially include corrugated cardboard (for example single-wall and multiwall qualities of the flute types used in industry and in the artistic/creative sector (for example A, B, C or E flute) with a wide variety of different liner papers (for

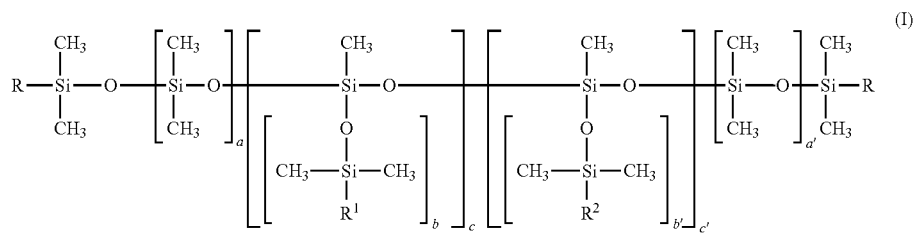

(I)

in which R, $R^1$ and $R^2$ in the average molecule can be identical or different and denote an alkyl radical having 1 to 30, preferably 8 to 22 carbon atoms or the radical —Z—$(C_nH_{2n}O—)_mR_3$, where $R_3$ is a hydrogen radical or an alkyl radical having 1 to 8 carbon atoms, Z is a divalent radical of the formula —O—, —$(CH_2)_p$—O— or —$CH_2$—CH$(CH_3)$—$CH_2$—O— with p=2 to 6, n is an average numerical value from 2.7 to 4.0, m is an average numerical value from 5 to 130, a and a' together have an average numerical value from 4 to 1500, b and b' together have an average numerical value from 0 to 100, and c and c' together have an average numerical value from 0 to 50.

example bogus paper, brown board, kraft liner, test liner, and singly and multiply coated and single- and multiple-volume qualities such as GD2 or Kemiart Ultra), folding boxes (for example single-sidedly coated qualities for packaging for dry foods, medicaments and other dry goods, double-sidedly coated and/or laminated qualities for moist, greasy or oily goods (e.g. frozen foods or fats)), bags (e.g. bakers' bags, paper carrier bags, single-and multi-ply bags for dry, moist and greasy goods), sacks (e.g. single- and multi-ply sacks for goods such as cement, cat litter, seeds or dry feed), hygiene papers (for example serviettes, kitchen towels, cosmetic tissues and toilet paper, also including moist tissues and impregnated pads), aseptic packaging cartons (for example the packaging from TetraPak®, SIG Combibloc® or Elopak®) and other aseptic cardboard packaging.

Preference is likewise given to the use of packaging and consumer articles made from plastic. These especially include:

packaging films (e.g. PE, PP, OPP, BOPP, PET, PEN (polyethylene naphthalate, e.g Teonex®), polyesters (e.g. Hostaphan® or Melinex®), cellulose hydrate films (Cellophan®), PVC (polyvinyl chloride), up to and including "biofilms" such as PLA (polylactic acid), in single-ply form or as multi-ply composites (also referred to as laminates), protective films, separation films, decorative films (e.g. d-c-fix® from Konrad Hornschuch AG), carrier films, transfer films, barrier films, nappy films, medical films, functionalized films and other films in common use rigid plastic materials such as plastic sheets (e.g. Plexiglas® from Rohm GmbH, polycarbonate sheets such as Makrolon®, PVC sheets etc.).

In addition, use on metallic substrates is also possible and preferred. This especially include aluminium foils or composite materials containing aluminium (e.g. as lids for yogurt pots, lids for ready meals and animal nutrition, packaging for medical products and similar packaging), and composite sheets (for example DiBond®) and metal sheets (for metal packaging such as biscuit tins, signs, metal panels and similar consumer articles).

In addition, use is also very possible and preferred for the construction and furniture industry, especially on sheet materials such as facing boards (available, for example, under the brand names Trespa® Meteon® or Resopal® (high-pressure laminates) or Etemit® (fiber cement sheets)), sheets and panels for interior and exterior uses (for example GFRP (glass fiber-reinforced plastic), Plexiglas®, panels made from composite material or plastic (for example the PVC panels from Deceuninck)), dry construction boards (for example gypsum plasterboard (e.g. Rigips boards from Saint-Gobain Rigips GmbH, or Drystar board or Aquapanel® from Knauf Gips KG), gypsum fiberboards (e.g. Fermacell® from Fermacell GmbH) and others such as gypsum blocks and screed elements), laminate floors (for example decorated MDF sheets (medium-density fiberboard) from Kronotex) and a wide variety of different sheet types for furniture and interior finishing (MDF, OSB (oriented strand board), plywood (sheets made from glued veneer layers), multiplex sheets (specific form of plywood board with veneer layers of different thickness and increased strength), screenprinted sheets (plywood sheets with phenolic resin coating and pattern embossed by screenprinting), glued laminated timber (sheets composed of glued and partly mortised solid wood), etc.).

In addition, use on glass and ceramic surfaces is also possible and preferred. These especially include bottles, glasses and other vessels made of glass and ceramic materials (e.g. ware or technical ceramics such as insulators or crucibles for high-temperature applications), and also a wide variety of different types of flat glass and flat ceramic material (for example flat glass (even or in a wide variety of different curvatures), tiles, technical ceramics such as heat-resistant tiles), safety glasses (for example Securit® or bullet-proof glass) and a wide variety of different tempered or coated glasses and ceramics, explicitly including technical glasses (for example spectacle glasses, lenses, panes, etc.).

In addition, use of the formulation of the invention is possible and preferred in cosmetic products such as nail varnishes, and also in inks, indian inks and other color preparations for use in or application with fountain pens, technical pens, felt pens, ballpoint pens and other writing instruments.

Additionally possible and preferred is use of the formulation of the invention in paints, inks, indian inks and other paint and varnish preparations for applications by means of industrial and artistic methods, such as dipping, spraying, rolling, brush application, die application, airbrushing, curtain coating.

Substrates used (coated) with the (defoamed) composition of the invention may in principle be any printable and coatable substrates known to those skilled in the art. This means both flexible and rigid substrates.

The substrates mentioned hereinafter are intended to serve for better illustration and are particularly preferred, but should not be regarded as a restriction to these specific substrates.

Suitable substrates in these applications include a wide variety of different qualities which are used in various end uses that are customary on the market.

In the end use of corrugated cardboard, these are uncoated papers, for example kraft liner, test liner and bogus paper. In the case of these paper qualities, the printability of the liner paper is affected to a significant degree by the proportion and quality of the used paper used in the production. Specifically qualities having a high proportion of unsorted used paper, as usual in the case of bogus paper, require a defoamer having defined action for clean printing. In addition, in the case of corrugated cardboard, especially for higher-quality packaging, coated papers are frequently used, for example coated kraft liner (for example of the Kemiart Ultra quality from MetsäBoard) and coated test liner (for example Topliner GD2, as supplied by manufacturers such as Papyrus). The coating of such types of paper affects two parameters essential for the printing: building of bubbles and foam. The bubbles and foam would make it difficult to achieve homogeneous coatings, which in turn necessitates the use of a defoaming agent having defined action. In addition, in the case of corrugated cardboard, for specific applications, for example for the packing of doughs and other baking materials or the packaging of moisture-sensitive goods such as powders, paper qualities coated with plastics such as PE or PET are used. In addition, paper qualities provided with barrier coatings (for example the X300 grease barrier coating from Michelman) are also used in the production of secondary packaging for greasy goods (for example cooking fats).

In the end use of folding boxes and similar cardboard packaging, primarily coated paper and card qualities are used. The demands on printability and the substrate used are analogous to those already described for the end use of corrugated cardboard.

In the end use of pouches and bags, usually kraft and natron paper having gram weights below 100 g/m$^2$ are used. These are generally only lightly coated, if at all, and compacted by calendering. The printing characteristics are similar to those of coated papers for corrugated cardboard production. As a result of the high regulatory demands on the color fastness of packing bags such as bakers' bags and butchers' bags (fastness according to DIN EN 646 prolonged contact is required), the demands in terms of defined efficacy and minimum migration potential are particularly high in the case of paints and varnishes for these packaging materials.

In the end use of sack packaging, various uncoated and coated papers are used as liner papers. The sacks, which are also referred to in the industry as block bottom sacks, according to their nature and the specific weight of the goods, have a multilayer structure composed of various paper and/or plastic plies. According to the goods to be packed, there is variation both in the liner papers and in the demands on the printing inks and printing varnishes used for printing. Specifically in the case of goods such as dry feed for animals or seed, demands regarding defoaming are high. Moreover, the high demands in terms of abrasion resistance, blocking resistance and defined anti-slip properties of the surface place a great challenge on the performance of the composition, since these properties are closely connected to the uniformity of the paint or varnish film applied.

In the end use of newspapers, various usually uncoated and also coated papers are used as liner papers. In printing, defoaming agents are used when methods such as flexographic printing, gravure printing, screenprinting or digital printing methods such as inkjet printing are being utilized. The challenge for the performance of defoaming agents in this end use is the speed of substrate particularly in the case of very high-speed printing machines which reach speeds of up to 1,000 m/minute. This is of crucial significance for the avoidance of bubbles and foams.

In the end uses of form printing and pinstriping inks, various paper qualities, usually lightly coated qualities, are used. However, in the case of products from the low-cost segment, uncoated papers are also used, and, for high-quality forms and writing materials, coated and calendered papers are also used as substrate. The printing is frequently effected by flexographic printing, and less commonly by gravure printing or offset printing. Screen printing is usually used only for special effects, for example the printing of raised structures such as Braille or security features. Digital printing methods such as inkjet printing are employed here either for very small runs or in combination with one of the conventional printing methods for the individualization of the prints. Similarly to the end use of newspapers, the central demand on the composition is the avoidance of bubbles and foams in order to achieve a faultless exact printed image. The situation is similar with the recycling capacity of the printed papers. Here, high molecular weight formulations, with their positive properties in terms of migration potential, make a positive contribution to an improvement in quality and extend the possible uses of the substrate qualities produced with the recycling material.

In the end uses of gift-wrapping paper, a wide range of very different paper qualities and in some cases also film qualities is used. The range goes from substantially uncoated, only lightly calendered or structured qualities as white or brown material through various coated and calendered qualities up to high-quality metallized substrates and nonwoven material. In the case of films, usually PET and OPP are printed, although other film types are also possible. The challenge for the foaming agent in this application lies particularly in the avoidance of bubbles and foams, since the producers typically produce with just one color series if at all possible for reasons of logistics and storage. Moreover, in this very design-driven end use, the demands on appearance and hence on an exact faultless printed image are very high. Furthermore, the usually very high printing speeds (usually between 200 and 500 meters per minute) place a high demand on the defoaming agent. Printing methods employed are traditionally gravure printing and flexographic printing in particular. Screen printing is utilized comparatively rarely and, if so, usually only for special effects such as raised structures or the printing of very large effect pigments (for example mother-of-pearl pigment, glitter or flakes having particle sizes of 60 μm or more). Digital printing methods such as inkjet are usually employed here either for very small runs or for the creation of specimen collections. In the case of qualities which are used with proximity to foods, moreover, a low migration potential of the ingredients used is an important parameter. Here, high molecular weight defoaming agents with their positive properties in terms of migration potential are a positive factor.

In the end uses of decorative paper (papers with natural or artificial decor for consumer articles such as furniture, laminate floors, kitchen worktops, etc.), primarily absorptive papers having slight to moderate coating are used. Some of these are bulk-colored. In addition, what are called pre-impregnates are also printed, where the decorative paper is impregnated beforehand with a melamine resin solution. The printing is primarily effected by gravure printing, usually at machine speeds of 200 to 600 meters per minute. In this respect, the same demands as also described in the other applications with high printing speeds apply here. Flexographic printing plays a lesser role in the printing of decorative papers and is used primarily in the production of simpler qualities, for example decorative material for rear cupboard walls. Nevertheless, the demand with regard to defoaming applies here too analogously to the end uses already described. Digital printing methods such as inkjet are usually employed here either for very small runs or for the creation of specimen collections. At the same time, the significance of small runs is increasing constantly as a result of the trend to individual designs and the possibility of order-based production. Specifically the substrate qualities mentioned having high absorptivity on the one hand and a melamine resin surface on the other hand require a defoaming agent having defined action for clean printing, in order to avoid faults.

In the end use of wallpaper, a wide range of very different substrate qualities is in use. The range goes from coated papers through PVC-coated papers (also called vinyl in the industry) as far as high-quality uncoated and coated nonwoven fabric types. Nonwoven fabric refers in the wallpaper sector to paper qualities having a synthetic fiber content (usually PE or PP) of typically 10% to 20%. The printing methods used are likewise varied. Typically, the manufacturers combine various printing methods with one another in order to be able to achieve all the effects desired from a design point of view in one production line. Usually, flexographic printing or gravure printing is combined with rotary screen printing, roll application methods and scatter coating. In some cases, for individualizations and small runs, digital printing methods such as inkjet or toner-based printing are also used.

In the end uses of hygiene papers (serviettes, kitchen towels, toilet paper, cosmetic tissues, etc., explicitly including moist tissues, impregnated cosmetic pads and similar products), primarily very absorptive papers are used, with or without light calendering. In some cases, however, nonwoven qualities having different synthetic fiber contents (generally between 5% and 100%) are used. In the individual end use, one or more (typically two to four) plies of substrate are used. In terms of printing methods, mainly flexographic printing is employed. The machine speeds generally range from 150 metres per minute up to 500 meters per minute. In some cases, however, an embossed print is used, in which the color impression is made by the application of a colored adhesive by means of specific embossing rollers. This method is increasingly being used in the production of toilet paper.

In the end use of labels, various lightly to highly coated paper qualities are used. In some cases, metallized qualities are also used. In addition, a wide variety of different foil qualities are also used. However, in the case of products from the low-cost sector, uncoated, lightly calendered papers are also used. The printing is frequently effected by flexographic printing, gravure printing or offset printing. Screen printing is usually used only for special effects, for example the printing of raised structures such as Braille or security features. Digital printing methods such as inkjet printing are employed here either for very small runs or in combination with one of the conventional printing methods for the individualization of the prints. Similarly to the end use of form printing, the central demand on the defoaming agent is the avoidance of bubbles and foam in order to achieve a faultless exact printed image.

In the end use of aseptic drinks packaging and similar cardboard packaging, primarily coated paper and card qualities are used. The demands on printability and the defoamer used are analogous to those described for the end use of corrugated cardboard. The printing characteristics are similar to those of coated papers for corrugated cardboard production. By virtue of the high regulatory demands in this end use, the demands with regard to defined efficacy and minimum migration potential are particularly high in the case of paints and varnishes for these packaging materials. This necessitates the use of defoaming agents that are optimized in this regard.

In the end use of packaging films, a multitude of film qualities are used. These range from PE, PP, OPP, BOPP, PET, PEN (polyethylene naphthalate, e.g. Teonex®), polyesters (e.g. Hostaphan® or Melinex®), cellulose hydrate films (Cellophan®), PVC (polyvinyl chloride) as far as "biofilms" such as PLA (polylactic acid). This enumeration is merely illustrative. All other potentially usable film substrates are explicitly included. This applies equally in the case of the films mentioned hereinafter having various barrier or functional or effect coatings.

In some cases, these films are also used having been provided with various barrier coatings (PVDC, EVOH, SiOx, AlOx, etc.), functional coatings (e.g. nanoparticles for improving scratch resistance and other mechanical properties, e.g. TEGO® Nanoresins) or metallization.

The printing is usually effected by flexographic printing or gravure printing. Screen printing is usually used only for special effects, for example the printing of raised structures such as Braille or security features. Digital printing methods such as inkjet printing are employed here either for very small runs or in combination with one of the conventional printing methods for the individualization of the prints. A further field of use for inkjet printing here is the printing of barcodes and product information such as use by/best before dates. In the industry, this sector is also referred to as coding and marking. Similarly to other end uses with nonabsorptive substrates already described, the central demand on the defoaming agent is the avoidance of bubbles and foam, in order to achieve a faultless exact printed image.

The present invention further provides compositions comprising
a) at least one formulation according to the invention
b) optionally one or more pigments and fillers
c) at least one binder
d) optionally one or more waxes
e) optionally at least one solvent
f) optionally one or more film-forming aids (coalescents)
g) optionally one or more rheology additives
h) optionally one or more wetting agents
i) optionally one or more neutralizers
j) optionally other components (such as retardants, glide additives, etc.)

Compositions particularly preferred in accordance with the invention comprise
a) a formulation according to the invention
b) one or more pigments and fillers, preferably selected from the group of Pigment White 6 (titanium dioxide either in the rutile variant or in the anatase variant), Pigment Black 7 (carbon black), Pigment Blue 15:3 or Pigment Blue 15:4 (phthalocyanine pigments), Pigment Red 57:1 (laked BONA pigment (BONA=beta-oxynaphthoic acid)), Pigment Yellow 12, Pigment Yellow 13, (diarylide yellow and diarylide orange pigments), Pigment Violet 23 (dioxazine pigment) and/or Pigment Green 7 (phthalocyanine pigment),
c) at least one binder
d) optionally one or more waxes
e) optionally at least one solvent
f) optionally one or more film-forming aids (coalescents)
g) optionally one or more rheology additives
h) optionally one or more wetting agents
i) optionally one or more neutralizers
j) optionally other components (such as retardants, glide additives, etc.) and are especially suitable for use as printing color, printing ink or printing varnish and other colors, varnishes, inks, color preparations and coatings applied by means of analogue or digital coating methods for the abovementioned substrates and fields of use.

Pigments and Fillers (Component b)):

In the listing which follows, the pigment types are described utilizing the international standard color indices. These include especially organic pigments: monoazo yellow and monoazo orange pigments (for example Pigment Yellow 1, Pigment Yellow 74, Pigment Yellow 111 or Pigment Orange 1), diarylide yellow and diarylide orange pigments (for example Pigment Yellow 12, Pigment Yellow 13, Pigment Yellow 14, Pigment Orange 16), bisacetoacetarylide pigments (for example Pigment Yellow 16, Pigment Yellow 155), disazopyrazolone pigments (for example Pigment Orange 13, Pigment Orange 34), β-naphthol pigments (for example Pigment Orange 5, Pigment Red 1), naphthol AS pigments (for example Pigment Red 2, Pigment Red 170, Pigment Red 184), laked β-naphthol pigments (for example Pigment Red 49:2, Pigment Red 53:1), laked BONA pigments (BONA=beta-oxynaphthoic acid) (for example Pigment Red 48:3, Pigment Red 57:1), laked naphthol AS pigments (for example Pigment Red 151, Pigment Red 247), laked naphthalenesulphonic acid pigments (for example Pigment Yellow 104, Pigment Red 60:1), benzimidazole pigments (for example Pigment Yellow 151, Pigment Yellow 181, Pigment Red 208, Pigment Violet 32), diazo condensation pigments (for example Pigment Yellow 93, Pigment Red 166, Pigment Red 242), metal complex pigments (for example Pigment Yellow 150, Pigment Red 257), isoindolinone and isoindoline pigments (for example Pigment Yellow 110, Pigment Yellow 185), phthalocyanine pigments (for example Pigment Blue 15:3, Pigment Blue 15:4, Pigment Blue 16, Pigment Green 7), quinacridone pigments (for example Pigment Violet 19, Pigment Red 122, Pigment Red 202, Pigment Red 282), perylene and perinone pigments (for example Pigment Red 123, Pigment Red 178, Pigment Black 31, Pigment Black 32, Pigment Orange 43, Pigment Red 194), thioindigo pigments (for example Pigment Red 88, Pigment Red 181), aminoanthraquinone pigments (for example Pigment Yellow 147, Pigment 89, Pigment Red 177, Pigment Blue 60, Pigment Violet 31), dioxazine pigments (for example Pigment Violet 23, Pigment Violet 37), triarylcarbonium pigments (for example Pigment Blue 56, Pigment Blue 61, Pigment Violet 3, Pigment Violet 27, Pigment Blue 62, Pigment Red 81:1, Pigment Red 81:3), quinophthalone pigments (for example Pigment Yellow 138), diketopyrrolopyrrole (DPP) pigments (for example Pigment Red 254, Pigment Red 255), aluminium laked pigments (for example Pigment Red 172, Pigment Blue 24:1, Pigment Blue 63), other organic pigments (for example Pigment Yellow 148, Pigment Yellow 182, Pigment Orange 64, Pigment Red 252, Pigment Brown 22, Pigment Black 1)

In addition, these especially include inorganic pigments: iron oxide pigments (for example Pigment Yellow 42, Pigment Red 101, Pigment Black 11), chromium oxide pigments (for example Pigment Green 17), ultramarine pigments (for example Pigment Blue 29, Pigment Violet 15, Pigment Red 259); complex inorganic chromatic pigments (rutile pigments: for example Pigment Brown 24, Pigment Yellow 53, Pigment Yellow 164 or spinel pigments: for example Pigment Blue 28, Pigment Blue 36, Pigment Green 50, Pigment Yellow 119, Pigment Brown 29, Pigment Black 22, Pigment Black 27, Pigment Black 28); cadmium pigments (for example Pigment Yellow 35, Pigment Yellow 37, Pigment Orange 20, Pigment Red 108); bismuth vanadate pigments (for example Pigment Yellow 184); cerium sulphide pigments (for example Pigment Orange 75, Pigment Red 265), chromate pigments (for example Pigment Yellow 34, white pigments: (for example Pigment White 4 (zinc white), Pigment White 5 (lithopone composed of barium sulphate and zinc sulphide), Pigment White 6 (titanium dioxide either in the rutile variant or in the anatase variant), Pigment White 7 (zinc sulphide), Pigment White 14 (calcium carbonate), Pigment White 21 and 22 (lead white)); black pigments (for example Pigment Black 1 (aniline black), Pigment Black 7 (carbon black)).

In addition, these especially include effect pigments: mother-of-pearl pigments (for example the Iriodin® pigments from Merck), glitter (for example the glitter products from RJA Plastics GmbH), flakes (for example the aluminium products from RJA Plastics GmbH), luminescent pigments (for example the Lumilux products from Honeywell), magnetic pigments (for example the iron oxide products from Cathay Industries), anticorrosion pigments (for example zinc phosphates, aluminium phosphates etc.), metal effect pigments (for example pigments based on aluminium, copper, gold bronzes (copper-zinc alloys), zinc and other metals, as manufactured, for example, by Carl Schlenk AG or Silberline Manufacturing Co., Inc.).

Particular preference is given to using the following pigments in many end uses: Pigment White 6 (titanium dioxide either in the rutile variant or in the anatase variant), Pigment Black 7 (carbon black), Pigment Blue 15:3 or Pigment Blue 15:4 (phthalocyanine pigments), Pigment Red 57:1 (laked BONA pigment (BONA=beta-oxynaphthoic acid)), Pigment Yellow 12 or Pigment Yellow 13 (diarylide yellow and diarylide orange pigments), Pigment Violet 23 (dioxazine pigment), Pigment Green 7 (phthalocyanine pigment).

Preferred fillers are, for example, chalk (calcium carbonate), magnesium (magnesium carbonate), barium sulphate, etc. The term "fillers" also encompasses organic and inorganic flatting agents (for example the Acematt® and Aerosil® products from Evonik Industries AG) and all other fillers and flatting agents usable for the applications described in this document.

Binders (Component c)):

The following are usable with preference: acrylate binders (as produced, for example, under the Induprint® brand name by Indulor AG or under the Degalan® brand name by Evonik Industries AG), styrene acrylate binders (as produced, for example, under the Joncryl® brand name by BASF SE or under the Indurez® brand name by Indulor AG), polyester binders (as produced, for example, under the AddBond® or Dynapol® brand names by Evonik Industries AG), polyol resins (as produced, for example, under the VariPlus® brand name by Evonik Industries AG), maleate and fumarate binders (as produced, for example, under the Erkamar® brand name by Robert Kraemer), binders based on natural raw materials (for example binders based on sugar, starch, cellulose, casein, soya protein and derivatives thereof, and other types based on natural raw materials), polyvinyl alcohol binders (as produced, for example, under the Makrovil® brand name by Indulor AG), and all other binders usable for the applications described in this document. It is possible here to use some binders as supplied (e.g. Induprint SE 900), whereas others are used only after neutralization (e.g. Indurez SR 10) or other processing steps (e.g. casein).

Waxes and Additives Having Similar Effects (Component d)):

The waxes usable with preference includes PE waxes, PP waxes, PTFE waxes, Fischer-Tropsch waxes, amide waxes, paraffin waxes, camauba waxes, and all other waxes and wax-like substances usable for the applications described in this document.

Solvents (Component e)):

Solvents usable with preference are preferably water or organic solvents (for example ethanol, isopropanol, butanol, methoxypropanol, ethoxypropanol, ethyl acetate, methyl ethyl ketone), alone or in combination with one another, and all other solvents usable for the applications described in this document in any desired combination. Preference is particularly given to using water, ethanol, isopropanol and ethyl acetate.

Film-Forming Auxiliaries (Coalescents) (Component f)):

Film-forming auxiliaries usable with preference are, for example, glycols such as Dowanol DPnB, but also alcohols such as ethanol and all other film-forming auxiliaries usable for the applications described in this document.

Rheology Additives (Component g)):

Rheology additives usable with preference are organic rheology additives (for example acrylate thickeners (as produced under the Indunal® T 256 name by Indulor AG or under the Rheovis® AS 1125 SA (formerly Latekoll® D) name by BASF SE) or polyurethane thickeners (as produced, for example under the ViscoPlus® brand name by Evonik Industries AG or Tafigel® Pur by Münzing Chemie)) and inorganic rheology additives (as produced, for example, under the Aerosil® brand name by Evonik Industries AG or Bentone® by Elementis).

Wetting Agents (Component h)):

Wetting agents usable with preference are, for example, organic-based wetting agents (for example products such as REWOPOL® SB DO 75, an anionic surfactant used as highly effective emulsifier with very good wetting properties for aqueous systems, REWOPOL® SB FA 50, a disodium sulfosuccinate fatty alcohol ethoxylate, 30% active content, TEGOPREN® 6814, an alkyl modified siloxane (liquid silicone wax) of organophilic behavior, SURFYNOL® AS 5000, a nonionic Dynamic wetting agent, SURFYNOL® AS 5020, a nonionic low-foam dynamic wetting agent, SURFYNOL® AS 5040, a non-foaming dynamic wetting agent, SURFYNOL® AS 5080, a nonionic organic superwetter, SURFYNOL® AS 5140, a formulated liquid, wetting agent based on proprietary combination of surface active chemistries, SURFYNOL® AS 5160, a solution of sodium diisooctyl sulfosuccinate in ethanol/water, SURFYNOL® AS 5180, an alcohol alkoxylate, TEGOPREN® 5840, a solvent free polyether siloxane, TEGOPREN® 5847, a wetting agent for paper, nonwoven & hygiene applications, medium foaming, suitable for curtain coating, TEGOPREN® 5878, a wetting agent for pressure sensitive adhesives with high water resistance, organomodified siloxane, TEGOPREN® 5885 a hydrophobic, non-ionic, polyether siloxane based wetting and dispersing agent, TEGO® Surten W 111, an alcohol alkoxylate, as produced by Evonik Industries AG) and all other wetting agents usable for the applications described in this document.

Neutralizers (Component i)):

Neutralizers usable with preference are amines (for example ammonia, DEMA, TEA, AMP, etc.), inorganic neutralizers, for example sodium hydroxide solution, potassium hydroxide solution, etc.) and all other neutralizing agents usable for the applications described in this document.

Other Components (Component j)):

These include:

retardants which are used to adjust the drying speed (for example glycerol, propane-1,2-diol, glycols such as polyethylene glycol (e.g. PEG 200 or PEG 400))

glide additives which are used to adjust the surface smoothness (for example TEGO® Glide 482 from Evonik Industries AG)

anticorrosives which are used to minimize corrosion in paint- or varnish-guiding application devices, storage or transport vessels or metering systems (for example COBRATEC® 99 from Raschig GmbH).

markers which are used, for example, to mark cutting lines, as a security feature or for checking the application quality (particularly in the case of non-pigmented systems) (for example the products from Blankophor GmbH & Co. KG sold under the Blankophor® name)

microencapsulated active ingredients, for example the microencapsulated fragrances FOLCO SCENT® from Follmann GmbH & Co KG plasticizers which serve for lasting flexibilization of the paint or varnish layers applied (for example Elatur® CH from Evonik Industries AG)

adhesion promoters for difficult substrates (for example ADDID® 900 from Evonik Industries for the improvement of adhesion on substrates such as glass or aluminium)

conductivity additives for the modification of the surface conductivity of paint and varnish layers applied (for example ADDID® 240 from Evonik Industries AG)

additives for specific surface effects (TEGO® Hammer 501 from Evonik Industries AG for the achievement of the hammered effect in paints and varnishes)

hydrophobizing agents which serve to achieve a water-repellent effect of the paint or varnish layers applied (for example TEGO® Phobe 1650 from Evonik Industries AG)

and preferably all other components usable advantageously for the applications described in this document.

Preferred Compositions of the Invention Contain a) 0.01% to 20% by weight, preferably 0.05% to 2% by weight, of the formulation according to the invention b) 0.0% to 75% by weight, preferably 2% to 50% by weight, more preferably 4% to 25% by weight, of at least one pigment, preferably at least one pigment selected from the group of Pigment White 6 (titanium dioxide either in the rutile variant or in the anatase variant), Pigment Black 7 (carbon black), Pigment Blue 15:3 or Pigment Blue 15:4 (phthalocyanine pigments), Pigment Red 57:1 (laked BONA pigment (BONA=beta-oxynaphthoic acid)), Pigment Yellow 12, Pigment Yellow 13, (diarylide yellow and diarylide orange pigments), Pigment Violet 23 (dioxazine pigment) and/or Pigment Green 7 (phthalocyanine pigment), c) 0.5% to 80% by weight, preferably 2% to 40% by weight, more preferably 7% to 30% by weight, of at least one binder d) 0.0% to 10% by weight, preferably 0.5% to 5% by weight, more preferably 1% to 2% by weight, of at least one wax e) 0.5% to 80% by weight, preferably 10% to 60% by weight, more preferably 20% to 50% by weight, of at least one solvent, preferably at least one solvent selected from water, ethanol, isopropanol and/or ethyl acetate, f) 0.5% to 70% by weight, preferably 1% to 10% by weight, more preferably 1% to 3% by weight, of at least one film-forming auxiliary g) 0.0% to 10% by weight, preferably 0.2% to 5% by weight, more preferably 0.5% to 2% by weight, of at least one rheology additive h) 0.0% to 5% by weight, preferably 0.05% to 2% by weight, more preferably 0.2% to 1% by weight, of at least one wetting agent i) 0.0% to 15% by weight, preferably 0.1% to 10% by weight, more preferably 0.2% to 5% by weight, of at least one neutralizer j) 0.0% to 25% by weight, preferably 0.1% to 10% by weight, more preferably 0.2% to 5% by weight, of at least one of the components listed under j where the sum total of all the components adds up to 100% by weight and all percentages by weight are based on the total weight of the composition.

A Composition according to the invention therefore comprises a formulation according to the invention. Preferably the composition according to the invention comprises the formulation according to the invention in an amount of from 0.05 to 2% by weight, more preferably of from 0.1 to 0.5% by weight based on the composition. The composition according to the invention is preferably a coating agent, a paint or a varnish.

Even without further explanations, it is assumed that a person skilled in the art can utilize the above description in the widest scope. The preferred embodiments and examples are therefore merely to be considered as being a descriptive, but in no way limiting disclosure.

The present invention is described in more detail below by reference to examples. Alternative embodiments of the present invention are obtainable analogously.

EXAMPLES

Test Methods:

a) Determination of Acid Number:

The concentration of acid end groups is determined in accordance with DIN EN ISO 2114 by titrimetric means in mg KOH/g of polymer (polyether).

b) Determination of OH Number (OHN):

OH-numbers are determined according to the method DGF C-V 17 a (53) of the German Society for Fat Science (Deutschen Gesellschaft für Fettwissenschaft). In this method the samples are reacted with acetic acid anhydride in the presence of pyridine and the consumption of acetic acid anhydride is determined via titration with 0.5 n KOH in ethanol against phenolphthalein.

c) Determination of Molecular Weight:

GPC measurement is used to determine the polydispersity Mw/Mn and the average molecular weight Mw and Mn of the polyethers. The measurement is done with a SECcurity 1260 chromatograph from PSS as follows: Column combination SDV 1000/10000 Å (length 65 cm), temperature 30° C., THF as mobile phase, flow rate 1 ml/min, sample concentration 10 g/l, refractive index detector PSS SECcurity 1260 RI, use of propylene glycol standard.

Raw Materials used

| Chemical name | Abbreviation | Trade name | Producer |
|---|---|---|---|
| polypropylene glycol monobutyl ether with an OH number of 29.0 mg KOH/g (acid number 0.05 mg KOH/g, water content 0.08% by weight) | PGMBE | | Evonik Resource Efficiency GmbH |
| solid maleic acid anhydride (99 weight-%) | | | |
| chlorosulfonic acid (99 weight-%) | | | |
| polyphosphoric acid ($P_2O_5$ content 85 % by weight) | | | |
| emulsion of a polyether siloxane copolymer in water, containing fumed silica | TF 1488 | TEGO® FOAMEX 1488 | Evonik Resource Efficiency GmbH |
| emulsion of a polyether siloxane copolymer in water, containing fumed silica | TF 3062 | TEGO® FOAMEX 3062 | Evonik Resource Efficiency GmbH |
| polyether siloxane copolymer, containing fumed silica, solvent-free | TA 901 W | TEGO® AIREX 901 W | Evonik Resource Efficiency GmbH |
| Non-ionic polyurethane based thickener | | TEGO® Visco Plus 3030 | Evonik Resource Efficiency GmbH |
| Propylene glycol | | | |
| Butyl diglycol | | | |
| White spirit | | | |
| Acrylic dispersion | | ACRONAL® LR 9014 | BASF SE |
| aqueous solution of a copolymer with groups of high pigment affinity | | TEGO® Dispers 755 W | Evonik Resource Efficiency GmbH |
| Fumed Silica | | AEROSIL® 200 | Evonik Resource Efficiency GmbH |
| FeO(OH) pigment | | BAYFERROX® 3920 | LANXESS Deutschland GmbH |
| Water based combination combination of chloromethyl-/methyl-isothiazolone (CMI/MI) and bronopol | | PARMETOL® A 28 | Schülke&Mayr GmbH |
| ammonia based high performance dispersion resin solution | | JONCRYL® HPD 96E | BASF SE |
| Pigment yellow | | IRGALITE® Yellow K1415 | BASFSE |
| organic polymer, silicone-free contains fumed silica | | TEGO® Foamex 830 | Evonik Resource Efficiency GmbH |
| aqueous solution of surface active substances and polymers with groups of high pigment affinity | | TEGO® Dispers 760 W | Evonik Resource Efficiency GmbH |
| 2-Amino-2-methyl-1-propanol | AMP-90 | AMP-90™ | ANGUS CHEMICAL COMPANY |

Preparation of Test Formulations and Test Methods

A1. Yellow Wood Stain Formulation

The yellow wood stain formulation was prepared by mixing the raw materials as given in Table B.

TABLE B amount of raw material used for the preparation of the yellow wood stain formulation.

| Position | Raw material | [% by weight] | [g] |
|---|---|---|---|
| B1 | demineralized water | 12 | 480.0 |
| B2 | AMP-90 | 0.1 | 4.0 |
| B3 | propylene glycol | 2.1 | 84.0 |
| B4 | butyl diglycol | 1 | 40.0 |
| B5 | white spirit | 1 | 40.0 |
| B6 | Acronal® LR 9014 | 69.4 | 2776.0 |
| B7 | pigment concentrate (Table C) | 1 | 40.0 |
| B8 | demineralized water | 12.9 | 516.0 |
| B9 | Tego® Visco Plus 3030 | 0.5 | 20.0 |
| Sum | | 100 | 4000 |

TABLE C amount of raw material used for the preparation of the pigment concentrate.

| Position | Rohstoff | [% by weight] | [g] |
|---|---|---|---|
| C1 | VE-Wasser | 19.4 | 38.8 |
| C2 | Tego® Dispers 755 W | 24 | 48.0 |
| C3 | Tego® Foamex 830 | 1 | 2.0 |
| C4 | Aerosil® 200 | 0.5 | 1.0 |
| C5 | Bayferrox® 3920 | 55 | 110.0 |
| C6 | Parmetol® A 28 | 0.1 | 0.2 |
| Sum | | 100 | 200.0 |

A2. Yellow Wood Stain Test Method

The test was run during two working days. 50 g of the yellow wood stain formulation according to A1 were given into a 180 mL PE-beaker. 10 g demineralized water was added into the PE-beaker. Afterwards the formulation according to the invention was added in an amount as given in Table B above and incorporated using a 3 cm dissolver disk for 3 minutes at a speed of 1500 rpm. The material was then allowed to stand for 24 hours unchanged and was afterwards applied to a black PVC foil (supplied by Piltz Folien) using a 60 μm wire bar (supplied by Erichsen) to obtain a coating. The coating was checked visually for defects using a scale from 1 for not compatible to 10 for compatible.

B1. Flexoink K1 Formulation

The preparation of the K1 formulation was done using a TLM basket mill supplied by VMA Getzmann. Table D is listing the raw materials and the amount of the raw materials used for preparation of the formulation.

The raw material of position D1 was introduced into the basket mill. The raw material of positions D3 and D4 were added under stirring. Afterwards the raw material of position D2 was added while stirring more slightly. ⅔ of the amount of position D5 was afterwards. The dispersing was continued for 4 hours at 4000 rpm. 10 minutes before the end of dispersing the remaining ⅓ of position D5 was added. During the whole dispersing process, it must be avoided that too much air enters the dispersion.

TABLE D raw material used for the preparation of the Flexodruck K1 formulation.

| Position | Raw material | [% by] | [g] |
|---|---|---|---|
| D1 | Joncryl ® HPD 96E | 32.40 | 810.0 |
| D2 | Irgalite ® Yellow | 35.00 | 875.0 |
| D3 | TEGO ® Foamex 830 | 0.50 | 12.5 |
| D4 | TEGO ® Dispers 760W | 2.00 | 50.0 |
| D5 | demineralized water | 30.10 | 752.5 |
| sum | | | 2500.0 |

B2. Flexoink K1 Test Method 50 g of the Flexoink K1 formulation according to B1 were given into a 120 mL PE-beaker. Afterwards the formulation according to the invention was added in an amount as given in Table D above and incorporated using a 3 cm dissolver disk for 1 minutes at a speed of 1500 rpm. The material was then frothed up for 2 minutes using a speed of 5000 rpm. 45 g of the resulting foam were given into a 100 mL measuring cylinder and the volume obtained was read off. The lower the volume was, the better was the function of the formulation according to the invention as defoamer. Afterwards, the foamed material was poured back into the PE-beaker and the collapse of the foam was observed.

The compatibility of the defoamer formulation of the invention was tested using a 12 μm wire bar (supplied by Erichsen) to obtain a coating. As substrate a Melinex 401 CW (100 μm thickness) polyester film supplied by Piltz Folien was used. The coating was checked visually for defects using a scale from 1 for not compatible to 10 for compatible.

C. Architectural Coatings 1 Formulation and Test

To 50 g of a dispersion paint (Alpinaweiß Das Original, Alpina Farben GmbH) 0.4% by weight based on the amount of dispersion paint of the formulation of the invention were added and incorporated using a Getzmann CV-Plus Dispermat with a 3 cm dissolver disk for 5 minutes at a speed of 1500 rpm. The mixture was then allowed to stand for 24 hours unchanged and was afterwards applied to a glass plate using a 50 μm wire bar (supplied by Erichsen).

The coating was checked visually for defects using a scale from 1 for not compatible to 10 for compatible.

Example 1a: Preparation of a carboxyl terminated polyether 2114 g of PGMBE, a polypropylene glycol monobutyl ether with an OH number of 29.0 mg KOH/g (acid number 0.05 mg KOH/g, water content 0,08% by weight) were filled into a 4 L flask provided with stirrer, heating mantle, and reflux condenser and heated to about 80° C. Using nitrogen, the content of the flask was rendered inert using nitrogen. Subsequently, 112.4 g solid maleic acid anhydride (99 weight-%) were added in several portions via a powder funnel under stirring within 20 minutes. The anhydride melted and a homogenous reaction mixture was obtained. The reaction temperature was raised to 130° C. and the reaction mixture was stirred at that temperature for 4.5 hours. The liquid, almost colorless product obtained was cooled to a temperature below 70° C. and removed from the flask. The acid number of the product was determined to be 28.0 mg KOH/g.

Example 1b: Preparation of a Sulfate Terminated Polyether 997.4 g of PGMBE, a polypropylene glycol monobutyl ether with an OH number of 29.0 mg KOH/g (acid number 0.05 mg KOH/g, water content 0,08% by weight) were filled into a 2 L flask provided with stirrer, dropping funnel, and reflux condenser and cooled to about 17° C. using an ice bath. Using nitrogen, the content of the flask was rendered inert using nitrogen. Subsequently, 60.1 g chlorosulfonic acid (99 weight-%) were added under stirring within 25 minutes from the dropping funnel. The reaction temperature was held at about 25° C. by cooling using the ice bath. The homogeneous reaction mixture became brown colored during the reaction. After the end of the addition of the chlorosulfonic acid the mixture was stirred for another 90 minutes at a temperature of 25° C. Afterwards the hydrogen chloride produced during the reaction was removed within 25 minutes using a distillery with a vacuum of 20 mbar and a temperature of 25 to 30° C. A homogenous liquid product having a brown color was obtained.

Example 1c: Preparation of a Phosphorylated Polyether 1001 g of PGMBE, a polypropylene glycol monobutyl ether with an OH number of 29.0 mg KOH/g (acid number 0.05 mg KOH/g, water content 0,08% by weight) were filled into a 2 L flask provided with stirrer, heating mantle, dropping funnel, and reflux condenser and heated to 100° C. Using nitrogen, the content of the flask was rendered inert using nitrogen. Subsequently, 43.2 g polyphosphoric acid (P2O5 content 85% by weight) heated to 80° C. were added while stirring from the dropping funnel within 2 hours. The reaction mixture was held at 100° C. for the whole time. During the reaction the reaction mixture the color of the mixture became brown. After the addition of the polyphosphoric acid was complete, the reaction mixture was stirred for another 4 hours at 100° C. Afterwards the brown reaction product was let out via a BECO K2 filter plate.

Example 2: Preparation of Defoamer Formulations

Defoamer formulations were prepared by mixing different defoamers with different amounts of the polyethers obtained in examples 1a to 1c. table 2a gives an overview about the defoamers and polyethers used as well as the amount polyethers used. The amount of the polyethers are given in % by weight based on the amount of the defoamer. Examples 2.0, 2.10, and 2.20 are comparative examples/formulations (not according to the invention).

TABLE 2

Composition of the defoamer formulation according to the invention and the reference sample.

| Example | Defoamer | Polyether | Amount in % by weight |
|---|---|---|---|
| 2.0 | TF 1488 | — | — |
| 2.1 | TF 1488 | Example 1b | 1 |
| 2.2 | TF 1488 | Example 1b | 3 |
| 2.3 | TF 1488 | Example 1b | 5 |
| 2.4 | TF 1488 | Example 1a | 1 |
| 2.5 | TF 1488 | Example 1a | 3 |
| 2.6 | TF 1488 | Example 1a | 5 |
| 2.10 | TA 901 W | — | — |
| 2.11 | TA 901 W | Example 1a | 1 |
| 2.12 | TA 901 W | Example 1a | 3 |
| 2.13 | TA 901 W | Example 1a | 5 |
| 2.14 | TA 901 W | Example 1c | 1 |
| 2.15 | TA 901 W | Example 1c | 3 |
| 2.16 | TA 901 W | Example 1c | 5 |
| 2.20 | TF 3062 | — | — |
| 2.21 | TF 3062 | Example 1a | 1 |
| 2.22 | TF 3062 | Example 1a | 3 |
| 2.23 | TF 3062 | Example 1a | 5 |
| 2.24 | TF 3062 | Example 1b | 1 |
| 2.25 | TF 3062 | Example 1c | 3 |
| 2.26 | TF 3062 | Example 1c | 5 |

Example 3: Test of the Performance of the Defoamer Formulation

The defoamier formulations of example 2 were tested with the test systems given in A1/A2, B1/B2, and C. The compositions and test results are given in Table 3.

TABLE 3a

Compositions used and test results obtained with the B1/B2 test system.

| Example | Defoamer formulation of example | Amount defoamer formulation added in % by weight | Volume (mL) | Compatibility |
|---|---|---|---|---|
| 3a.0 | 2.0 | 0.4 | 53 | 6 |
| 3a.1 | 2.1 | 0.4 | 52 | 6 |
| 3a.2 | 2.2 | 0.4 | 51 | 5 |
| 3a.3 | 2.3 | 0.4 | 51 | 5 |
| 3a.4 | 2.4 | 0.5 | 52 | 7 |
| 3a.5 | 2.5 | 0.5 | 52 | 7 |
| 3a.6 | 2.6 | 0.5 | 52 | 6 |

It can be seen from the examples that the defoamier formulations according to the invention have a good or better compatibility and good or better defoaming behavior than the formulation not according to the invention.

TABLE 3b

Compositions used, and test results obtained with the A1/A2 test system

| Example | Defoamer formulation of example | Amount defoamer formulation added in % by weight | Compatibility |
|---|---|---|---|
| 3b.0 | 2.0 | 0.4 | 2 |
| 3b.1 | 2.1 | 0.4 | 3 |
| 3b.2 | 2.2 | 0.4 | 4 |
| 3b.3 | 2.3 | 0.4 | 5 |
| 3b.4 | 2.4 | 0.5 | 7 |
| 3b.5 | 2.5 | 0.5 | 6 |
| 3b.6 | 2.6 | 0.5 | 5 |
| 3b.7 | 2.1 | 0.25 | 5 |
| 3b.8 | 2.2 | 0.25 | 6 |
| 3b.9 | 2.3 | 0.25 | 7 |
| 3b.10 | 2.4 | 0.25 | 5 |
| 3b.11 | 2.5 | 0.25 | 6 |
| 3b.12 | 2.6 | 0.25 | 5 |
| 3b.13 | 2.10 | 0.25 | 4 |
| 3b.14 | 2.11 | 0.25 | 4 |
| 3b.15 | 2.12 | 0.25 | 6 |
| 3b.16 | 2.13 | 0.25 | 5 |
| 3b.17 | 2.14 | 0.25 | 5 |
| 3b.18 | 2.15 | 0.25 | 5 |
| 3b.19 | 2.16 | 0.25 | 5 |

It can be seen from the examples 3b.1 to 3b.12 and 3b.14 to 19 that the defoamier formulations according to the invention have a good or better compatibility than the formulation not according to the invention (3b.0 and 3b.15).

TABLE 3c

Compositions used, and test results obtained with the C test system

| Example | Defoamer formulation of example | Amount defoamer formulation added in % by weight | Compatibility |
|---|---|---|---|
| 3c.0 | 2.20 | 0.4 | 5 |
| 3c.1 | 2.21 | 0.4 | 7 |
| 3c.2 | 2.22 | 0.4 | 8 |
| 3c.3 | 2.23 | 0.4 | 7 |
| 3c.4 | 2.24 | 0.4 | 6 |
| 3c.5 | 2.25 | 0.4 | 6 |
| 3c.6 | 2.26 | 0.4 | 6 |

It can be seen from the examples 3c.1 to 3c.6 that the defoamer formulations according to the invention have a better compatibility than the formulation not according to the invention (3c.0).

The invention claimed is:

1. A formulation, comprising a polyether siloxane, wherein a polyether that is terminated with an ester group and that is different from the polyether siloxane is present in the formulation in an amount of from 0.5 to 10% by weight based on the complete formulation,
    wherein the polyether is polpropylene glycol monobutyl ether that is terminated with an ester group, wherein the ester group is selected from the group consisting of sulfate, phosphorylate, and maleate, and wherein the formulation is a defoamer formulation.

2. The formulation according to claim 1, wherein the polyether is terminated with a sulfate group.

3. The formulation according to claim 1, wherein the polyether is present in an amount of from 0.75 to 7.5% by weight, based on the complete formulation.

4. The formulation according to claim 1, wherein the formulation comprises fumed silica.

5. The formulation according to claim 1, wherein the formulation comprises water.

6. The formulation according to claim 1, wherein the polyether siloxane is of the general formula described by formula (I)

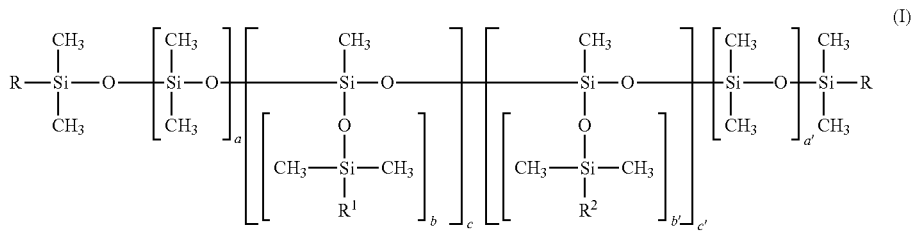

in which
R, $R^1$ and $R^2$ in the average molecule can be identical or different and denote an alkyl radical having 1 to 30 or the radical $-Z-(C_nH_{2n}O-)_mR_3$,
wherein
$R_3$ is a hydrogen radical or an alkyl radical having 1 to 8 carbon atoms,
Z is a divalent radical of the formula $-O-$, $-(CH_2)_p-O-$ or $-CH_2-CH(CH_3)CH_2-O-$ with p=2 to 6,
n is an average numerical value from 2.7 to 4.0,
m is an average numerical value from 5 to 130,
a and a' together have an average numerical value from 4 to 1500,
b and b' together have an average numerical value from 0 to 100, and
c and c' together have an average numerical value from 0 to 50.

7. The formulation according to claim 6, wherein in formula (I) b+b' is >0 and c+c' is >0, and R, $R_1$, and $R_2$ are the radical $-Z-(C_nH_{2n}O-)_mR_3$, Where $R_3$ is a hydrogen radical or an alkyl radical having 1 to 8 carbon atoms, Z is a divalent radical of the formula $-O-$, $-(CH_2)_p-O-$ or $-CH_2-CH(CH_3)-CH_2-O-$ with p=2 to 6, with molecular weights (Mn)>1000.

8. A process for the production of a defoamed composition, comprising adding the formulation according to claim 1 to a composition to be defoamed.

9. The process according to claim 8, wherein the formulation is added to the composition in an amount of from 0.05 to 2% by weight, based on the composition to be defoamed.

10. The process according to claim 8, wherein the composition to be defoamed is selected from coating agents, paints, and varnishes.

11. A composition, comprising a formulation as claimed in claim 1 in an amount of from 0.05 to 2% by weight, based on the composition.

12. The composition according to claim 11, wherein the composition is a coating agent, a paint or a varnish.

13. The formulation according to claim 1, wherein the polyether is polypropylene glycol monobutyl ether that is terminated with a sulfate group.

14. The formulation according to claim 1, wherein the polyether is present in an amount of from 1 to 5% by weight, based on the complete formulation.

15. The formulation according to claim 6, wherein in formula (I) b+b' is >0 and c+c' is >2, and R, $R_1$, and $R_2$ are the radical $-Z-(C_nH_{2n}O-)_mR_3$, where $R_3$ is a hydrogen radical or an alkyl radical having 1 to 8 carbon atoms, Z is a divalent radical of the formula $-O-$, $-(CH_2)_p-O-$ or $-CH_2-CH(CH_3)-CH_2-O-$ with p=2 to 6, with molecular weights (Mn)>1000.

16. The process according to claim 8, wherein the formulation is added to the composition in an amount of from 0.1 to 0.5% by weight, based on the composition to be defoamed.

17. A composition, comprising a formulation as claimed in claim 1 in an amount of from 0.1 to 0.5% by weight, based on the composition.

* * * * *